United States Patent
De Maquille et al.

(10) Patent No.: US 9,083,807 B2
(45) Date of Patent: Jul. 14, 2015

(54) SYSTEM FOR CONNECTING TWO CLIENT ENTITIES

(71) Applicant: Orange, Paris (FR)

(72) Inventors: Cyril De Maquille, Versailles (FR); Sebastien Megnin, Clamart (FR); Frederic Mazeiras, Boulogne Billancourt (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/449,828

(22) Filed: Aug. 1, 2014

(65) Prior Publication Data
US 2015/0036812 A1 Feb. 5, 2015

(30) Foreign Application Priority Data
Aug. 2, 2013 (FR) .................................. 13 57704

(51) Int. Cl.
| | |
|---|---|
| H04M 3/42 | (2006.01) |
| H04M 3/54 | (2006.01) |
| H04M 3/20 | (2006.01) |
| H04M 3/533 | (2006.01) |

(52) U.S. Cl.
CPC ........ *H04M 3/54* (2013.01); *H04M 3/20* (2013.01); *H04M 3/42195* (2013.01); *H04M 3/533* (2013.01)

(58) Field of Classification Search
USPC ............. 379/213.01, 212.01, 211.02, 201.01, 379/211.01; 455/417
See application file for complete search history.

(56) References Cited

U.S. PATENT DOCUMENTS

| | | | |
|---|---|---|---|
| 5,712,902 A | 1/1998 | Florence et al. | |
| 6,904,060 B2 * | 6/2005 | Nelson et al. | 370/526 |
| 7,228,145 B2 * | 6/2007 | Burritt et al. | 455/519 |

FOREIGN PATENT DOCUMENTS

EP 0689333 A2 12/1995

OTHER PUBLICATIONS

French Search Report and Written Opinion dated Jul. 4, 2014 for corresponding French Patent Application No. 1357704, filed Aug. 2, 2013.
English translation of the French Written Opinion dated Jul. 4, 2014 for corresponding French Patent Application No. 1357704, filed Aug. 2, 2013.

* cited by examiner

*Primary Examiner* — Thjuan K Addy
(74) *Attorney, Agent, or Firm* — David D. Brush; Westman, Champlin & Koehler, P.A.

(57) ABSTRACT

The invention relates to a system for connecting a first client entity (10) to a second client entity (11) in a communications network. Said first client entity has subscribed to a connection service. A routing module routes via a connecting device (50) a first call made by the second client entity to the first client entity and redirected to a third client entity (12). Said connecting device inserts a linking module (40) for the interception of said first call. A first branch is established between the second client entity and the linking module and a second branch is established between the linking module and the third client entity. The connecting device then detects a second call associated to the connection service made by the first client entity via the linking module, and then connects the first and second client entities by connecting the first branch and this second call by means of the linking module.

8 Claims, 3 Drawing Sheets

SYSTEM FOR CONNECTING TWO CLIENT ENTITIES

CROSS-REFERENCE TO RELATED APPLICATIONS

This Application claims priority to and benefits of French Patent Application No. FR 13 57704, filed with the French Patent Office on Aug. 2, 2013, the content of which is incorporated herein by reference in its entirety.

FIELD OF THE DISCLOSURE

The invention concerns a system for connecting two client entities or terminal devices.

The invention relates to the general field of telecommunications.

More specifically, it concerns the connection of two client entities, following a call made by the first client entity to the second client entity, where the call has not been completed and has been redirected to a third client entity.

BACKGROUND OF THE DISCLOSURE

In a known way, a voice messaging service is associated with most fixed and mobile network telephone services, regardless of whether they are based on circuit switching or voice-over-IP (Internet Protocol) technology.

Thus, if a call made by a calling terminal to a called terminal cannot be completed for any reason (terminal busy, unavailable, no reply, unconditional call forwarding to its messaging service, terminal out of range, etc.), this call is redirected by the network of the called terminal to another destination, for example the voice messaging system of the called terminal. The user of the calling terminal can then leave a voice message for the called terminal on this messaging system, after, for example, the broadcasting of a voice welcome announcement by the messaging system. The call may also be redirected to another call number.

The terms "calling" and "called" are used henceforth in relation to the call that has been missed. Frequently, the user of the called terminal rapidly detects the call from the calling terminal that he has missed, and attempts to connect to it immediately. If the call has been forwarded to the messaging system, or to another number, the called terminal can no longer connect to the calling terminal while the call of the latter is in progress after the redirection. The calling terminal may be obliged to terminate the current call or make a consultation call. These actions require an interaction of the user of the calling terminal which depends on the human-machine interface of the terminal and is not always straightforward.

SUMMARY

In a first aspect, the invention proposes a method for connecting a first client entity to a second client entity in a communications network. Said first client entity has subscribed to a connection service. The method comprises a step of routing via a connecting device a first call made by the second client entity to the first client entity and redirected to a third client entity, and the following steps performed by the connecting device:

inserting a linking module for the interception of said first call, a first branch being established between the second client entity and the linking module and a second branch being established between the linking module and the third client entity;

detecting a second call associated to the connection service and made by the first client entity via the linking module;

connecting the first and second client entities by connecting the first branch and said second call by means of the linking module.

The second client entity, that is to say the calling terminal, has attempted to connect to the first client entity, that is to say the called terminal, and has been redirected to the third client entity. This third client entity may, for example, be a messaging system, or alternatively a call queuing system. Thus the call has been missed by the first client entity. This is the case, for example, when the terminal is busy or unavailable or does not reply, or when unconditional forwarding to the messaging system is configured, or alternatively when the mobile terminal is not located in a coverage area of the network.

Thus, because of the connection method, the first client entity can connect to the second client entity which had tried to connect to it, without the need for any special operations by the user of the second client entity on his terminal. These operations relate, in particular, to another call which is in progress following its redirection to the third client entity. The connection method thus makes it possible to simplify the interactions of the user of the second client entity with his terminal, if he wishes to terminate this other call in progress or to queue it. If the user of the second client entity has no operation to perform on this other call in progress, the connection method enables the first client entity to avoid having to send a plurality of calls to the second client entity until this other call in progress is terminated. The connection method thus makes it possible to improve the perception of the call service provided by a network operator as it appears to both the calling terminal and the called terminal.

The different forms or characteristics of embodiment mentioned below may be added, independently or in combination with one another, to the steps of the connection method as defined above.

In a specific embodiment, the second call is made to the second client entity and is redirected to the connecting device.

Thus the call made by the first client entity to the second client entity is redirected to the connecting device by a network apparatus. Generally, a terminal displays information regarding missed calls to its user. The human-machine interaction in the first client entity is thus simplified, since it is simply necessary to request a recall of the second client entity.

In a specific embodiment, the second call is made to the connecting device.

The first client entity directly contacts the connecting device in order to be connected to the second client entity. A key on the terminal can be programmed to access this service. Generally, a key on the terminal is programmed to interrogate the messaging system. Thus, when the connection service is provided jointly with the messaging service, it is simply necessary to press a key in order to contact the messaging service and to be connected, if this is still possible. Similarly, a key on the terminal can be programmed to connect to a queuing number. The human-machine interaction at the first client entity is thus simplified, since it is simply necessary to press this key in order to initiate a call to the connecting device.

According to a specific characteristic of the method, a call context associated with the first client entity comprises at least an item of information concerning the linking module inserted for interception into the first call, and the method further comprises a step of obtaining said call context after the detection of the second call.

Because of the call context associated with the first client entity, the connecting device can detect that the first call has been redirected to the third client entity, and is in progress via the linking module. The connecting device can thus connect the first client entity to the second client entity.

According to a specific characteristic, the method further comprises a step of broadcasting to at least one of the first and second client entities a notification regarding the connection in progress.

Thus the perception by the client entity notified of the connection is improved.

In a second aspect, the invention also concerns a system for connecting a first client entity to a second client entity in a communications network. Said first client entity has subscribed to the connection service. Said system comprises:

a routing module, arranged to route via a connecting device a first call made by the second client entity to the first client entity and redirected to a third client entity, said connecting device comprising:

a control module for controlling a linking module, arranged to cause the linking module to be inserted for the interception of, said first call, a first branch being established between the second client entity and the linking module and a second branch being established between the linking module and the third client entity;

a detection module, arranged to detect a second call associated with said connection service and made by the first client entity via the linking module;

the control module also being arranged to cause the first and second client entities to be connected by connecting the first branch and said second call by means of the linking module.

The advantages mentioned for the method according to the first aspect are directly applicable to the connecting system and to the connecting device.

In a particular embodiment, the connecting system further comprises a linking module, arranged to be inserted into a call.

In a third aspect, the invention concerns a program for a connecting device, comprising program code instructions intended to cause the execution of the steps of the connection method described above performed by said device, when this program is run by this connecting device and a recording medium, readable by a connecting device, on which a program for a device is recorded.

The advantages mentioned for the connection method according to the first aspect are directly applicable to the program for a connecting device and to the recording medium.

BRIEF DESCRIPTION OF THE DRAWINGS

The invention will be more clearly understood with the aid of the following description of specific embodiments of the connection method, with reference to the attached drawings, in which.

DETAILED DESCRIPTION OF ILLUSTRATIVE EMBODIMENTS

Figure 1:
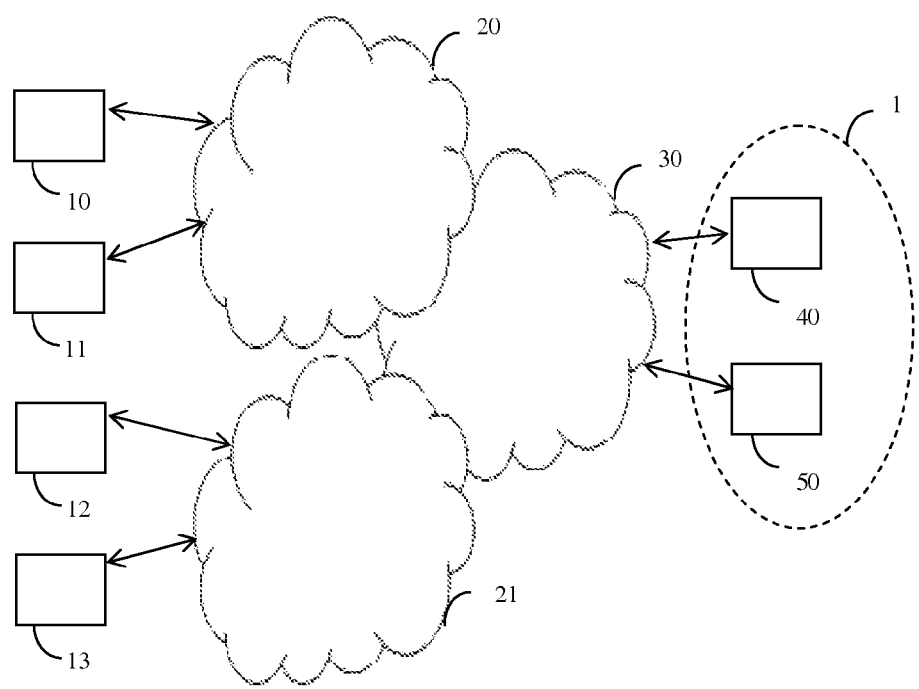
FIG. 1 shows a system for controlling a connection in a communications network.

FIG. 1 shows a system 1 for controlling a connection in a communications network, in its environment. The various devices shown in FIG. 1 communicate with one another via a communications network 30. More precisely, client entities 10 and 11 are connected to the communications network 30 via a first access network 20. Client entities 12 and 13 are connected to the communications network 30 via a second access network 21. By way of illustrative example, the first access network 20 is a fixed access network and the second access network 21 is a mobile access network. No limitations are placed on the nature of these access networks, or on the number of client entities connected to them.

In the example considered in FIG. 1, the control system 1 enables a user of a first client entity 12 to be connected to a second client entity 11 for a voice call. In this case it is assumed that this connection follows a missed call from the second client entity 11, that is to say the calling terminal, to the first client entity 12, that is to say the called terminal, and a redirection of the calling terminal 11 to a third client entity 13 via the control system 1. A missed call is, for example, a call to which the user of the called terminal 12 has not replied, a call which has been forwarded without any particular condition, a call which could not be completed because of the unavailability of the called terminal (terminal switched off or out of range), etc.

The third client entity 13 is, for example, a voice messaging system associated with the user of the called terminal 12, at which users can leave voice messages after a call to the called terminal 12 that has not been completed. By way of another illustrative example, the third client entity 13 is a call queuing device, such as a music recording at a telephone switchboard, or the terminal of an associated user (assistant, switchboard operator, etc.).

In a specific embodiment, the control system 1 comprises a voice messaging system.

In a specific embodiment, the calls are of the video type and the messaging system is a video messaging system.

No limitations are placed on the nature of the client entities 10-13. Thus the client entities may be telephone terminals, lap-top or desk-top computers, tablets, etc.

However, in order to provide a clearer illustration of the connection method, it will be assumed henceforth that the client entities 10-13 are telephones and that the calls are voice calls.

The telephone service may be based on circuit switching or voice over IP technology. No limitations are placed on this technology.

Henceforth, we will consider the case in which the calls between the client entities are established by means of the session initiation protocol (SIP).

Henceforth, the users of the client entities are considered to be identified by telephone numbers which enable them to be called and also to make calls to other client entities.

Clearly, other types of identities of client entities may be considered in the context of the connection method, depending, notably, on the nature of the terminals and of the communications network, since these identities enable the client entities to communicate on their respective networks and to be connected by means of these networks. Thus the connection method is equally applicable if the identities are electronic addresses, SIP or IP addresses, or others.

The control system 1 comprises a linking module 40 and a connecting device 50.

The connecting device 50 is arranged to execute a connection service logic for the purpose of detecting cases of crossed calls and controlling the linking module 40.

More precisely, the connecting device 50 is arranged for the purpose of:

causing the linking module 40 to be inserted for interception of a redirected call, detecting that a further call is associated with the redirected call (crossed calls) following a missed call, and causing the senders of these crossed calls to be connected while maintaining call continuity for the users.

The term "crossed calls" is used to describe a first call from A to B, missed by B and redirected to C, and a second call made by B either to A or to the voice messaging system.

Figure 3A:
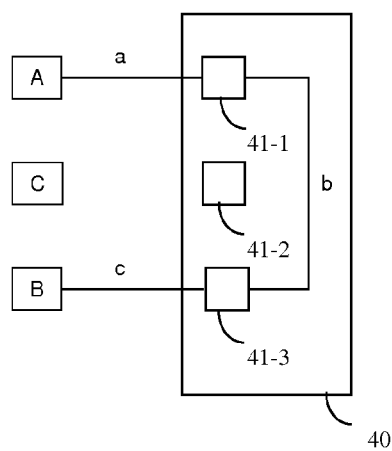
FIGS. 3a-3c show an example of the use of the connection method according to a specific embodiment of the invention.

In a specific embodiment, the linking module 40 comprises at least two elementary components 41. As shown in FIG. 3a, the linking module 40 comprises three elementary components 41-1, 41-2, 41-3. No limitations are placed on this number of elementary components. An elementary component 41 is, notably, arranged to provide a first external branch of a call and an internal link in the linking module 40 for this call. The first branch is established between a first client entity and a first elementary component 41-1. The internal link is established between the first elementary component 41-1 and a second elementary component 41-2. The second branch of the call is then established between the second elementary component 41-2 and a second client entity. Because of these elementary components 41-1, 41-2, the linking module 40 is arranged to be inserted for interception of a call between the two client entities, an internal link between these two elementary components 41 being established. Thus, as detailed below regarding the connection method, when two calls have to be connected, it is simply necessary to modify the internal links between the elementary components 41. This is done without hanging up the calls and without the need for any action by the users.

A system for connecting two client entities, not shown on FIG. 1, comprises in particular:
  a control system 1;
  a routing module, not shown on FIG. 1, located in the communications network, arranged to route via the control system 1 a first call made by a second client entity to a first client entity and redirected to a third client entity, said first client entity having subscribed to a connection service.

Figure 2:
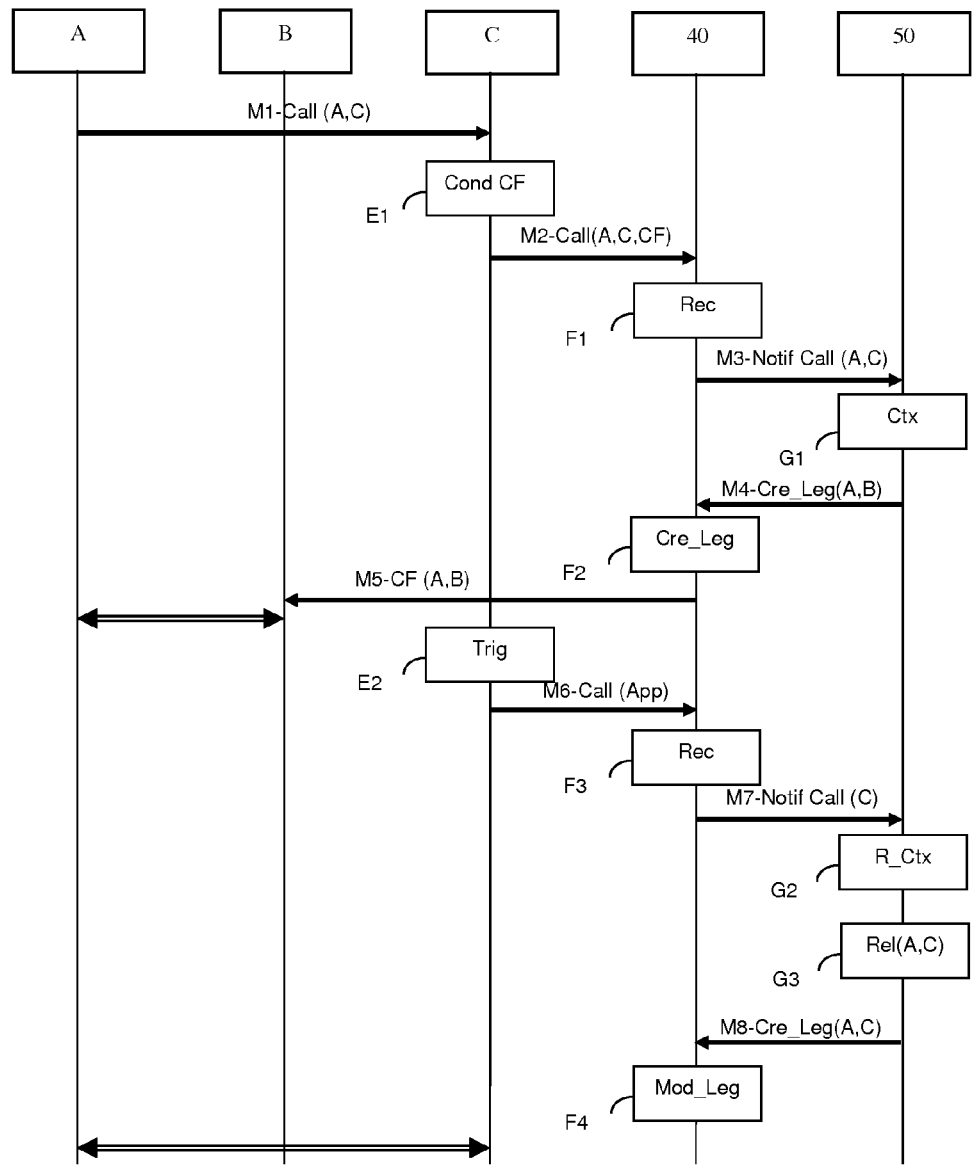
FIG. 2 shows steps of the connection method according to a specific embodiment of the invention.

The connection method, as used by the connecting system, and in particular by the control system 1, in a specific embodiment, will now be described with regard to FIG. 2, and will be illustrated by means of FIGS. 3a-3c.

In this specific embodiment, the connecting device 50 and the linking module 40 are two separate devices. No limitation is placed on this specific embodiment, and the connection method can easily be transferred to another embodiment in which the connecting device 50 and the linking module 40 form part of the same device.

The connecting device 50 and the linking module 40 communicate with one another via Web services over HTTP or a proprietary communication protocol. No limitations are placed on the type of protocol.

To simplify the description of the connection method, the second client entity 11 will henceforth be referred to as the calling terminal A, the third client entity 13 will be referred to as the redirection terminal B, and the first client entity 12 will be referred to as the called terminal C. This nomenclature of calling terminal, called terminal and redirection terminal is applied with respect to the first call made by the second client entity 11.

We will consider the case in which the called terminal C has activated a supplementary service for call forwarding in case of a failure to reply to terminal B. The called terminal C has also subscribed to the connection service.

The calling terminal A initiates a call to the called terminal C, referred to as the first call. This first call is represented in FIG. 2 in a simplified way by an arrow M1-Call(A,C).

Clearly, this call initiation may lead to exchanges of a number of protocol messages which, in order to simplify the description of the connection method, are not detailed here, and which are known from the prior art. The same applies to the subsequent exchanges between the client entities and the various networks.

In step E1, because there is no reply from the user of the called terminal C, and because the supplementary call forwarding service has been activated, the first call is forwarded to the redirection terminal B. This forwarding of the first call is performed by the access network 21 of the called terminal C and is represented as an arrow M2-Call(A,C,CF) in FIG. 2. This forwarded call is routed by the routing module via the control system 1.

More precisely, in step F1, the linking module 40 detects, by means of a first elementary component 41-1, that the first call is forwarded, and transmits a notification message M3-Notif Call(A,C) to the connecting device 50.

In step G1, the connecting device 50 creates a call context associated with the called terminal C. This call context comprises, notably, an identifier of the calling terminal A, an identifier of the redirection terminal C, and an item of information regarding the linking module 40 which will be inserted for interception into this first call. Also in this step G1, the connecting device 50 causes the linking module 40 to be inserted into the first call, by means of a message M4-Cre_Leg(A,C). As seen from the connecting device 50, the first call comprises a first branch between the calling terminal A and the linking module 40 and a second branch of the linking module 40 leading to the redirection terminal B.

The insertion command is received by the linking module 40 in step F2. More precisely, in the embodiment described here, the linking module 40 connects the first elementary component 41-1 via an internal link to a second elementary component 41-2, and directs the first forwarded call to its destination, that is to say the redirection terminal B. This redirection is represented in the form of an arrow M5-CF(A, B).

The linking module 40 is thus positioned for interception of the call between the calling terminal A and the redirection terminal B. This interception is shown in FIG. 3a. A first branch, denoted a, connects the calling terminal A to the first elementary component 41-1 of the linking module 40. A first internal link, denoted b, connects the first elementary component 41 to the second elementary component 41-2. A second branch, denoted c, connects the second elementary component 41-2 to the redirection terminal B.

The calling terminal A is then connected to the redirection terminal B.

We shall now consider the case in which the user of the called terminal C detects that he has missed the first call made by the calling terminal A. It should be remembered that the terms "called" and "calling" are used in relation to the first missed call. The user of the called terminal C then initiates, in step E2, a second call, to the called terminal A for example, represented by an arrow M6-Call (App) in FIG. 2.

The linking module 40 receives the second call in step F3, and transmits a notification message M7-Notif Call(C) to the connecting device 50. This notification message M7 indicates, notably, that the called terminal C is currently initializing a call to the calling terminal A or to the voice messaging system.

Figure 3B:
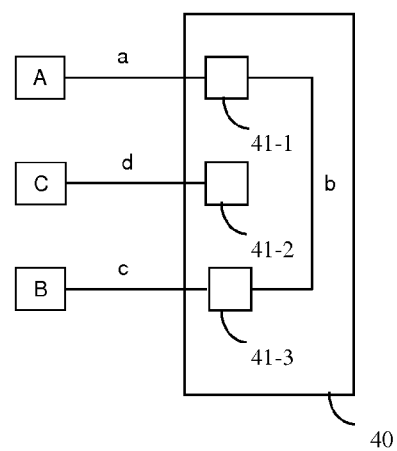

FIG. 3b shows the linking module 40 at the end of this step F3. A third branch, denoted d, is created between the called terminal C and a third elementary component 41-3 of the linking module 40.

The connecting device 50 receives this notification message in step G2 and detects that it is a call associated to the connection service, more precisely a call that has crossed with the first call for which it received a notification message in step G1. In a specific embodiment, in order to detect this crossed call, the connecting device 50 obtains the call context associated with the called terminal C and thus determines that the first call is in progress between the calling terminal A and the redirection terminal B.

In this step G3, the connecting device 50 commands the linking module 40, by means of a message M8-Cre_Leg(A, C), to connect the called terminal C to the calling terminal A via an internal connection in the linking module 40 and to drop the second branch of the first call between the linking module 40 and the redirection terminal B.

In step F4, the linking module 40 receives the command and executes it. It should be remembered here that the linking module 40 has been inserted for interception into the first call established between the calling terminal A and the redirection terminal B. The linking module 40 connects the first branch of the first call sent from the calling terminal A to the third branch of the second call sent from the called terminal C, and drops the second branch of the first call. Thus a voice call is established between the calling terminal A and the called terminal C without the need for complicated actions by the terminal users.

Figure 3C:
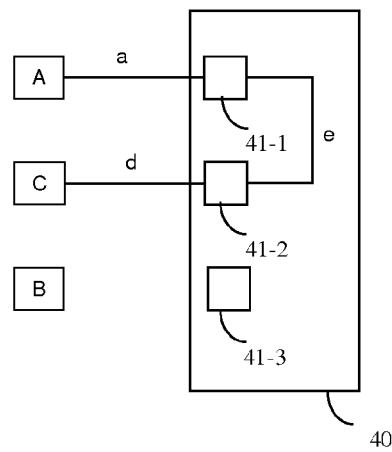

FIG. 3c shows the configuration of the linking module 40 at the end of this step F4. The second branch c between the linking module 40 and the redirection terminal B has been dropped. The first internal link b between the first 41-1 and the second 41-2 elementary components has been dropped. A second internal link, denoted e in FIG. 3c, has been established between the first 41-1 and the third 41-3 elementary components. The calling terminal A and the called terminal C are thus connected by means of the first branch a, the second internal link e and the third branch d.

Other embodiments are equally feasible, while remaining within the scope of the connection method described above.

In the embodiment described here, the redirection terminal B, that is to say the third client entity 13, is connected to the same access network 21 as the called terminal C. No limitations are placed on the access network to which the redirection terminal is connected, and this terminal may be located in another access network.

In a specific embodiment, the user of the calling terminal B has subscribed to the connection service and his calls are automatically redirected to the connection service by means of mechanisms commonly used in communications networks. By way of illustrative example, for a communications network based on an IMS (IP Multimedia Subsystem) architecture, an R-IM-SSF (Reverse IMS Service Switch Function) gateway provides users with access to services based on an Intelligent Network architecture.

In another specific embodiment, the called terminal B can call the connection service directly, the service logic being used to decide whether or not to connect this terminal to the calling terminal A.

In another specific embodiment, the method further comprises a step of broadcasting to at least one of the first and second client entities a notification regarding the connection in progress. The notification may be a voice message or in the form of a text message displayed on the terminal screen. For example, if the called terminal C is connected to the connection service, it is notified that the calling terminal A is leaving it a voice message on the voice messaging system and offers to connect it. If it accepts, it is notified of the connection. The calling terminal A may also be notified of this connection.

Thus the control system 1 and the connecting system allow new types of use in the management of telephone calls, meeting a variety of customer requirements. For example, Alice calls Bob, who cannot immediately find his telephone. Alice is forwarded to Bob's voice messaging service. Bob calls the service in order to be connected to Alice who is currently leaving a message: they are automatically connected to each other and can then speak to each other directly. In another example, Alice's call to Bob's mobile terminal is forwarded to a fixed terminal also associated with Bob. Bob decides to pick up Alice's call on his mobile terminal, to avoid having to move. Bob calls the service to be connected to Alice who is currently waiting (ring tone) for a reply from the fixed station.

Figure 4:
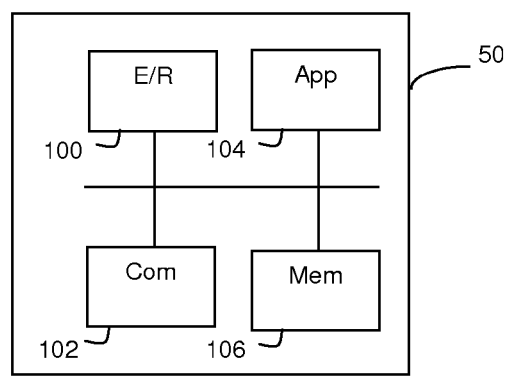
FIG. 4 shows a connecting device according to a specific embodiment of the invention.

A connecting device 50 will now be described in a specific embodiment, with reference to FIG. 4. This connecting device 50 comprises, notably:

a communication module 100, arranged to communicate with a linking module 40;

a control module 102, arranged to control the linking module 40;

a detection module 104, arranged to detect a second call made by a first client entity via the linking module, this second call having crossed with a first call made by a second client entity to the first client entity;

a memory area 106.

The control module 102 is, notably, arranged to command:

the insertion of the control module 40 for the interception of the first call made by the second client entity to the first client entity and redirected to a third client entity, a first branch being established between the second client entity and the linking module 40 and a second branch being established between the linking module 40 and the third client entity;

the connection of the first and second client entities, by connecting the first branch and said second call together by means of the linking module 40.

The detection module 104 is also arranged to use the logic of the connection service, as described above.

In a specific embodiment, the detection module 104 is also arranged to create a call context associated with the called terminal C in the memory area 106, and, on detecting the second call, in order to obtain the call context associated with the called terminal C so as to determine that the first call is in progress between the calling terminal A and the redirection terminal B.

In a specific embodiment, the connecting device 50 controls a plurality of linking modules 40.

In a specific embodiment, the connecting device 50 also comprises a linking module 40.

The invention is applied by means of software and/or hardware components. In this context, the term "module" may equally well refer, in this document, to a software component, a hardware component, or a set of hardware and/or software components, adapted to perform a function or a set of functions as described above for the module in question.

A software component is considered to be one or more computer programs, one or more sub-programs of a program, or more generally any element of a program or a software package. This software component is stored in memory and is then loaded and run by a data processor of a physical entity, and can access the hardware resources of this physical entity (memory devices, recording media, communications buses, input/output circuit cards, user interfaces, etc.).

Similarly, a hardware component is considered to be any element of a hardware assembly. It may be a hardware component that may or may not be programmable, and may or may not have an integrated processor for running software.

For example, it may be an integrated circuit, a smart card, a circuit card for running microsoftware (firmware), etc.

In a specific embodiment, the modules 102, 104 are arranged to execute the method described above. They are preferably software modules comprising software instructions for the execution of the steps of the connection method described above, used by a connecting device. The invention therefore also concerns:

a program for a connecting device, comprising program code instructions intended to command the execution of the steps of the connection method described above, when said program is run by said connecting device;

a recording medium, readable by a connecting device, on which the program for a connecting device is recorded.

The software modules may be stored in or transmitted by a data medium. This medium may be a hardware storage medium, for example a CD-ROM, a magnetic disk or a hard disk, or a transmission medium such as an electrical, optical or wireless signal, or a telecommunications network.

Although the present disclosure has been described with reference to one or more examples, workers skilled in the art will recognize that changes may be made in form and detail without departing from the scope of the disclosure and/or the appended claims.

The invention claimed is:

1. A method for connecting a first client entity to a second client entity in a communications network, said first client entity having subscribed to a connection service, said method comprising:
    routing via a connecting device a first call made by the second client entity to the first client entity and redirected to a third client entity, and
    the following acts performed by the connecting device:
        inserting a linking module for interception of said first call, a first branch being established between the second client entity and the linking module and a second branch being established between the linking module and the third client entity;
        detecting a second call associated to the connection service and made by the first client entity via the linking module;
        connecting the first and second client entities by connecting the first branch and said second call by the linking module.

2. The method according to claim 1, wherein the second call is made to the second client entity and is redirected to the connecting device.

3. The method according to claim 1, wherein the second call is made to the connecting device.

4. The method according to claim 1, wherein a call context associated with the first client entity comprises at least an item of information concerning the linking module inserted for interception into the first call, and said method further comprises obtaining said call context after the detection of the second call.

5. The method according to claim 1, further comprising broadcasting to at least one of the first and second client entities a notification regarding the connection in progress.

6. A system for connecting a first client entity to a second client entity in a communications network, said first entity having subscribed to a connection service, said system comprising:
    a connecting device; and
    a routing module, arranged to route via the connecting device a first call made by the second client entity to the first client entity and redirected to a third client entity,
    said connecting device comprising:
        a control module configured to control a linking module, arranged to command insertion of the linking module for interception of, said first call, a first branch being established between the second client entity and the linking module and a second branch being established between the linking module and the third client entity;
        a detection module arranged to detect a second call made by the first client entity via the linking module;
        the control module also being arranged to cause the first and second client entities to be connected by connecting the first branch and said second call by the linking module.

7. The system according to claim 6, further comprising the linking module, arranged to be inserted into a call.

8. A non-transitory computer-readable medium comprising a program stored thereon for a connecting device, comprising program code instructions configured to command execution of a method for connecting a first client entity to a second client entity in a communications network, performed by said device, when said program is run by said device, said first client entity having subscribed to a connection service, said method comprising:
    routing via the connecting device a first call made by the second client entity to the first client entity and redirected to a third client entity,
    inserting a linking module for interception of said first call, a first branch being established between the second client entity and the linking module and a second branch being established between the linking module and the third client entity;
    detecting a second call associated to the connection service and made by the first client entity via the linking module; and
    connecting the first and second client entities by connecting the first branch and said second call by the linking module.

* * * * *

UNITED STATES PATENT AND TRADEMARK OFFICE
CERTIFICATE OF CORRECTION

| | | |
|---|---|---|
| PATENT NO. | : 9,083,807 B2 | Page 1 of 1 |
| APPLICATION NO. | : 14/449828 | |
| DATED | : July 14, 2015 | |
| INVENTOR(S) | : Cyril De Maquille et al. | |

It is certified that error appears in the above-identified patent and that said Letters Patent is hereby corrected as shown below:

Title Page, item (57)

In the Abstract:

please delete:

"The invention relates to a system for connecting a first client entity (10) to a second client entity (11) in a communications network. Said first client entity has subscribed to a connection service. A routing module routes via a connecting device (50) a first call made by the second client entity to the first client entity and redirected to a third client entity (12). Said connecting device inserts a linking module (40) for the interception of said first call. A first branch is established between the second client entity and the linking module and a second branch is established between the linking module and the third client entity. The connecting device then detects a second call associated to the connection service made by the first client entity via the linking module, and then connects the first and second client entities by connecting the first branch and this second call by means of the linking module."

and insert:

--A system is provided for connecting a first client entity to a second client entity in a communications network. The first client entity has subscribed to a connection service. A routing module routes via a connecting device a first call made by the second client entity to the first client entity and redirected to a third client entity. The connecting device inserts a linking module for the interception of the first call. A first branch is established between the second client entity and the linking module and a second branch is established between the linking module and the third client entity. The connecting device then detects a second call associated to the connection service made by the first client entity via the linking module, and then connects the first and second client entities by connecting the first branch and this second call by means of the linking module.--

Signed and Sealed this
Twenty-second Day of December, 2015

Michelle K. Lee
*Director of the United States Patent and Trademark Office*